(12) United States Patent
Shen et al.

(10) Patent No.: US 12,074,895 B1
(45) Date of Patent: Aug. 27, 2024

(54) ARTIFICIAL INTELLIGENCE (AI) DRIVEN CLASSIFIER USING DEFINED TAXONOMY FRAMEWORK

(71) Applicant: FORESCOUT TECHNOLOGIES, INC., San Jose, CA (US)

(72) Inventors: Yi Shen, Carrollton, TX (US); Cedrik Ho, Allen, TX (US); Mei Zhou, Plano, TX (US); Rajiv Murthy, Plano, TX (US); Shan-Wen Yan, Plano, TX (US)

(73) Assignee: Forescout Technologies, Inc., San Jose, CA (US)

( * ) Notice: Subject to any disclaimer, the term of this patent is extended or adjusted under 35 U.S.C. 154(b) by 0 days.

(21) Appl. No.: 18/500,845

(22) Filed: Nov. 2, 2023

(51) Int. Cl.
H04L 9/40 (2022.01)

(52) U.S. Cl.
CPC ...... H04L 63/1425 (2013.01); H04L 63/0245 (2013.01); H04L 63/101 (2013.01); H04L 63/1433 (2013.01)

(58) Field of Classification Search
CPC ............. H04L 63/1425; H04L 63/0245; H04L 63/101; H04L 63/1433; G06F 16/38; G06F 16/9535; G06F 16/30; G06F 16/3331
See application file for complete search history.

(56) References Cited

U.S. PATENT DOCUMENTS

| | | | | |
|---|---|---|---|---|
| 9,009,134 B2 * | 4/2015 | Xu | ............... | G06F 16/951 707/731 |
| 2008/0183685 A1 * | 7/2008 | He | ............... | G06F 16/24575 |
| 2010/0030734 A1 * | 2/2010 | Chunilal | ............... | H04L 51/214 709/205 |
| 2011/0055699 A1 * | 3/2011 | Li | ............... | G06F 16/951 707/E17.014 |
| 2014/0223488 A1 * | 8/2014 | Korst | ............... | H04N 21/4828 725/53 |
| 2019/0095535 A1 * | 3/2019 | Miller | ............... | G06Q 50/01 |
| 2020/0151201 A1 * | 5/2020 | Chandrasekhar | ........ | G06N 5/04 |
| 2022/0210079 A1 * | 6/2022 | Koren | ............... | G06F 18/24 |

(Continued)

OTHER PUBLICATIONS

Khin et al., "Query Classification based Information Retrieval System," 2018 International Conference on Intelligent Informatics and Biomedical Sciences (ICIIBMS) Year: 2018 | Conference Paper | Publisher: IEEE.*

(Continued)

*Primary Examiner* — Roderick Tolentino
(74) *Attorney, Agent, or Firm* — Womble Bond Dickinson (US) LLP

(57) ABSTRACT

Systems and methods for entity classification via an artificial intelligence model using a defined taxonomy framework are described. Entity classification includes identifying information associated with a entity, generating, by a processing device, a first query comprising the information associated with the entity and a first set of options for classification of the entity at a first level of classification granularity of a taxonomy framework, and providing the first query to a classification model. The method further includes receiving, from the classification model, a selection of a first option of the first set of options for classification and determining a classification of the entity based at least in part on the selection of the first option of the first set of options.

20 Claims, 11 Drawing Sheets

(56) References Cited

U.S. PATENT DOCUMENTS

2022/0358163 A1\* 11/2022 Makhija .............. G06F 16/3344
2023/0281194 A1\* 9/2023 Lezcano ............. G06F 16/2425
707/759

OTHER PUBLICATIONS

Gowtham et al., "Semantic Query-Featured Ensemble Learning Model for SQL-Injection Attack Detection in IoT-Ecosystems," IEEE Transactions on Reliability Year: 2022 | vol. 71, Issue: 2 | Journal Article | Publisher: IEEE.\*

\* cited by examiner

ARTIFICIAL INTELLIGENCE (AI) DRIVEN CLASSIFIER USING DEFINED TAXONOMY FRAMEWORK

TECHNICAL FIELD

Aspects and implementations of the present disclosure relate to network monitoring, and more specifically, entity classification via an artificial intelligence (AI) classification model using a defined taxonomy framework.

BACKGROUND

As technology advances, the number and variety of devices or entities that are connected to communications networks are rapidly increasing. Each device or entity may have its own respective vulnerabilities which may leave the network open to compromise or other risks. Preventing the spreading of an infection of a device or entity, or an attack through a network can be important for securing a communication network. Accordingly, devices or entities can be identified or classified for application of various network security measures.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
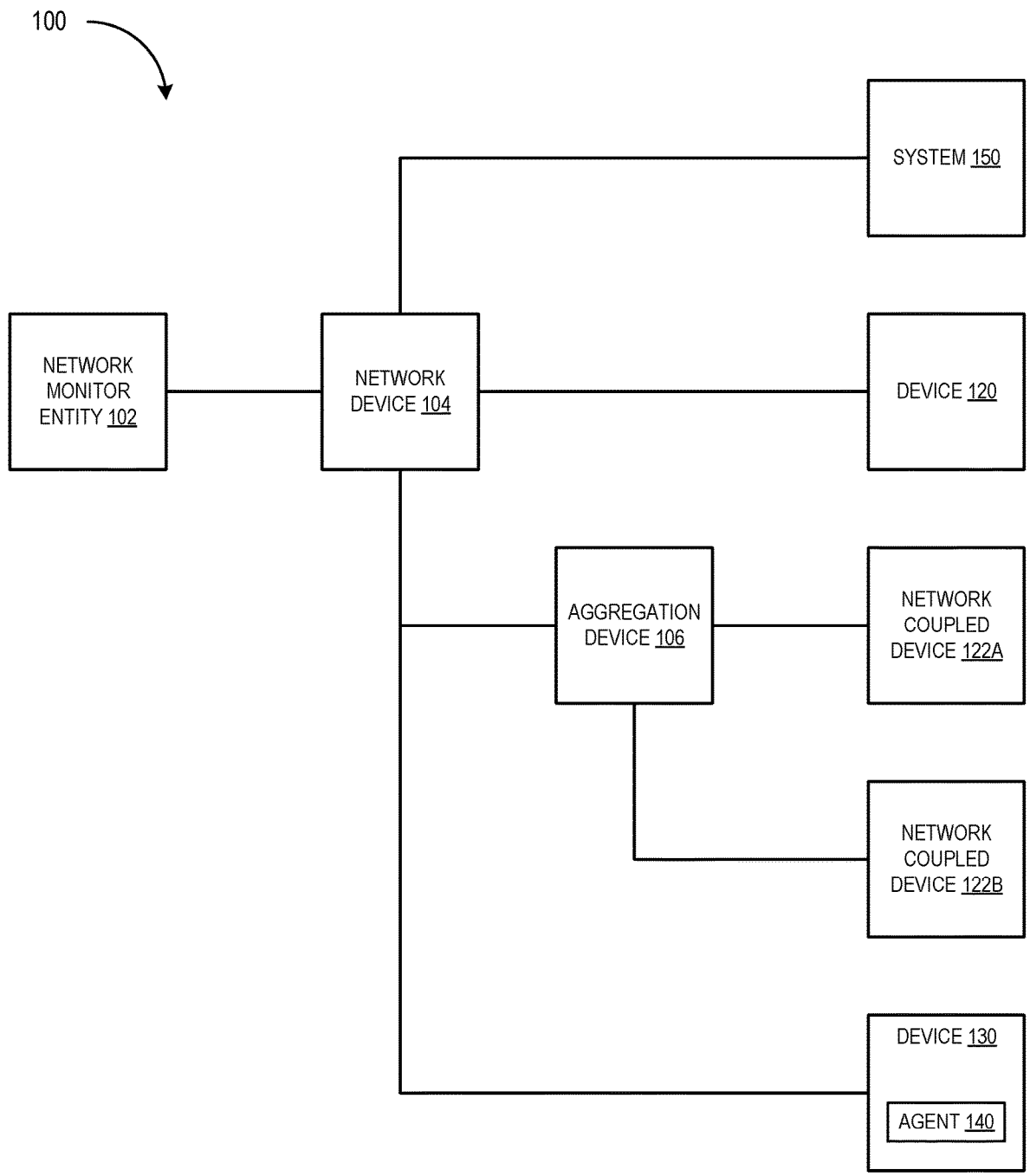
FIG. 1 depicts an illustrative communication network in accordance with one implementation of the present disclosure.

Aspects and implementations of the present disclosure are directed to entity classification via an artificial intelligence model using a defined taxonomy framework. The systems and methods disclosed can be employed with respect to network security, among other fields. More particularly, it can be appreciated that devices or entities with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained.

Conventionally, devices have been categorized or classified using specific classification paths embedded within a classification tree defining potential taxonomies. Generating and managing such unique taxonomies for devices may include extensive and manually intensive work including market research, industry insight, and customer feedback. As more and more devices are introduced to the market, the resources required for management of device taxonomies continues to increase exponentially.

For example, when a new device is introduced to the marketplace, developers may manually assign a classification path based on their best judgement, which involves analyzing existing taxonomies and determining if the device can be accommodated within these pre-existing categories or if there is a necessity to expand the current taxonomy framework. Expansion of the taxonomy framework within a classification tree denotes the addition of a new 'leaf' or subclass to the current path. As an example, consider an existing path in a current classification tree as: Information Technology/Computer/Apple. Here, a developer may extend the taxonomy if there is not a proper classification path in the current classification tree, deriving a new pathway from the existing one, for example leading to: Information Technology/Computer/Apple/Macintosh. In this scenario, 'Macintosh' becomes the added 'leaf'.

Artificial intelligence models, particularly large language models, though notable for classification abilities, suffer from a few key limitations. Primarily, the stability of classification results of such models is questionable (e.g., as each initialized session may produce varied outcomes). Additionally, such models do not currently possess a robust degree of professional knowledge and lack the necessary database support. Consequently, the taxonomy of large language model classification results tend to be unprofessional, making it difficult to deploy for actual customer interactions. Lastly, large language model training is generally based on openly available data sources and common sense, and thus fails to adeptly manage complex, real-world customer requirements.

Embodiments of the present disclosure provide for entity classification and taxonomy assignment via an AI classification model using a defined taxonomy framework. In some embodiments, a classification system may obtain a defined classification taxonomy framework by which a device or entity may be classified. For example, the defined classification taxonomy may include a classification tree with multiple levels of granularity for classification. Each level of the classification tree may include one or more child nodes depending or extending from a node in the prior level of the tree. For example, after a root node, a first level of the framework may include the broadest possible classification of an entity, after which each additional level of the framework may include more and more specific or narrow classifications. A leaf node of the classification tree may indicate a final classification (e.g., the most specific and narrow classification in the taxonomy pathway has been reached). The classification system may also receive or obtain information associated with a device, such as characteristics or properties of the device obtained from various sources. The classification system may then iteratively generate prompts to the AI classification model for each level of the classification tree using the device properties. For example, the classification system may generate a prompt at the broadest classification level of the classification tree to first determine a selection of a classification at the first level of the taxonomy framework. For example, the prompt may include a request for the model to classify the device into one of a set of possible classifications defined at the first level of the taxonomy framework. The classification system may store the classification at the first level and proceed with generating the prompt for the second level of the classification tree. The second prompt may include the child nodes of the classification selected at the first level of the classification tree. The classification may continue the prompt generation until a leaf node of the classification tree is reached, indicating that a final classification has been determined.

In some embodiments, the classification system and/or the AI classification model may determine that the entity to be classified cannot be classified within one of the defined classifications of a particular level of the classification tree. For example, the AI classification model may return a confidence score along with the classification at each level of the taxonomy framework (e.g., in response to each query). The classification system may determine whether the confidence score exceeds a minimum threshold score. If the confidence score does not exceed the threshold, the classification system may determine that the information available for classifying the device is insufficient to classify the device at the current granularity level. Accordingly, the classification system may then use the last successful classification level as a final classification for generating a taxonomy string for the device. Thus, the classification system may classify the device or entity as specific as possible within the taxonomy framework using the AI classification model.

Embodiments described herein provide advantages over conventional entity classification and taxonomy framework management, including reducing time and labor required for taxonomy framework management, improving accuracy and reliability of entity classification and identification of new device on the market or within a network that need to be classified and assigned a taxonomy within the framework, and increases visibility into the classification decision making process. Additionally, embodiments provide for enhanced capabilities to handle complex device properties as well as dynamically updating and managing taxonomy assignment (e.g., classification) as new devices are rapidly released in the market.

It can be appreciated that the described technologies are directed to and address specific technical challenges and longstanding deficiencies in multiple technical areas, including but not limited to entity classification, taxonomy determination, network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which an entity can access or communicate with. Segmentation or "zoning" can provide effective controls to limit movement across the network (e.g., by a hacker or malicious software). Enforcement points including firewalls, routers, switches, cloud infrastructure, other network devices/entities, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its entities and the amount of work or labor involved in configuring network entities. Accordingly, the method of classification and taxonomy assignment described herein provides for enhanced efficiency, accuracy, consistency, and effectiveness network segmentation.

Although some embodiments are described herein with reference to network devices, embodiments also apply to any entity communicatively coupled to the network. An entity or entities, as discussed herein, include devices (e.g., computer systems, for instance laptops, desktops, servers, mobile devices, IoT devices, OT devices, etc.), endpoints, virtual machines, services, serverless services (e.g., cloud-based services), containers (e.g., user-space instances that work with an operating system featuring a kernel that allows the existence of multiple isolated user-space instances), cloud-based storage, accounts, and users. Depending on the entity, an entity may have an IP address (e.g., a device) or may be without an IP address (e.g., a serverless service).

The enforcement points may be one or more network entities (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. Accordingly, the method of classification and taxonomy assignment described herein provides for enhanced efficiency, accuracy, consistency, and effectiveness network application of access rules within a network. It is appreciated that an enforcement point may be any entity that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122A-B. The devices 120 and 130 and network coupled devices 122A-B may be any of a variety of devices including, but not limited to, computing systems, laptops, smartphones, servers, Internet of Things (IOT) or smart devices, supervisory control and data acquisition (SCADA) devices, operational technology (OT)

devices, campus devices, data center devices, edge devices, etc. It is noted that the devices/entities of communication network 100 may communicate in a variety of ways including wired and wireless connections and may use one or more of a variety of protocols.

Network device 104 may be one or more network entities configured to facilitate communication among aggregation device 106, system 150, network monitor entity 102, devices 120 and 130, and network coupled devices 122A-B. Network device 104 may be one or more network switches, access points, routers, firewalls, hubs, etc.

Network monitor entity 102 may be operable for a variety of tasks such entity classification and taxonomy framework management via an AI classification model using a defined taxonomy framework, as described herein. Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, a SPAN (Switched Port Analyzer) port, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor entity 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122A-B. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122A-B on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to an entity being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network entities (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other entities (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122A-B and provide network access to network coupled devices 122A-B. Aggregation device 106 may further be configured to provide information (e.g., operating system, device software information, device software versions, device names, application present, running, or both, vulnerabilities, patch level, etc.) to network monitor entity 102 about the network coupled devices 122A-B. Aggregation device 106 may be a wireless access point that is configured to communicate with a wide variety of entities through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122A-B via a wireless connection. Aggregation device 106 may be configured to communicate with network coupled devices 122A-B using a standard protocol with proprietary extensions or modifications.

Aggregation device 106 may further provide log information of activity and attributes of network coupled devices 122A-B to network monitor entity 102. It is appreciated that log information may be particularly reliable for stable network environments (e.g., where the types of entities on the network do not change often). The log information may include information of updates of software of network coupled devices 122A-B.

Network monitor entity 102 may perform entity classification and entity taxonomy assignment using an AI classification model within the structure and context of a defined taxonomy framework. In some examples, the network monitor entity 102 may identify information associated with an entity (e.g., via network monitoring, aggregation and so forth, as described above, from a device database, from the user, etc.) to be classified. The network monitor entity 102 may iteratively generate prompts or queries to an AI classification model based on the identified information of the entity and a defined taxonomy framework. Each prompt may include the identified information of the entity and a set of potential classifications of the entity at a particular granularity within the taxonomy framework. For example, the network monitor entity 102 may begin with a prompt to classify the entity at the lowest granularity (e.g., broadest classification) in the taxonomy framework and once a classification is selected, the network monitor entity may proceed with generating a query for the next level of granularity (i.e., narrower more specific level) within the taxonomy framework (e.g., including the child nodes of the previously selected classification). Reaching a leaf node may indicate a final, narrowest possible classification of an entity within the taxonomy framework. In some examples, a final classification may be determined when the classification model indicates that there is insufficient information provided to classify the entity at a level of the framework. The final classification may thus be indicated by the last successful level of classification. Thus, the network monitor entity 102 may use the AI classification model to classify the entity within the context of the defined taxonomy framework and assign a taxonomy to the entity using chained iterative prompts to the AI classification model.

Figure 2:
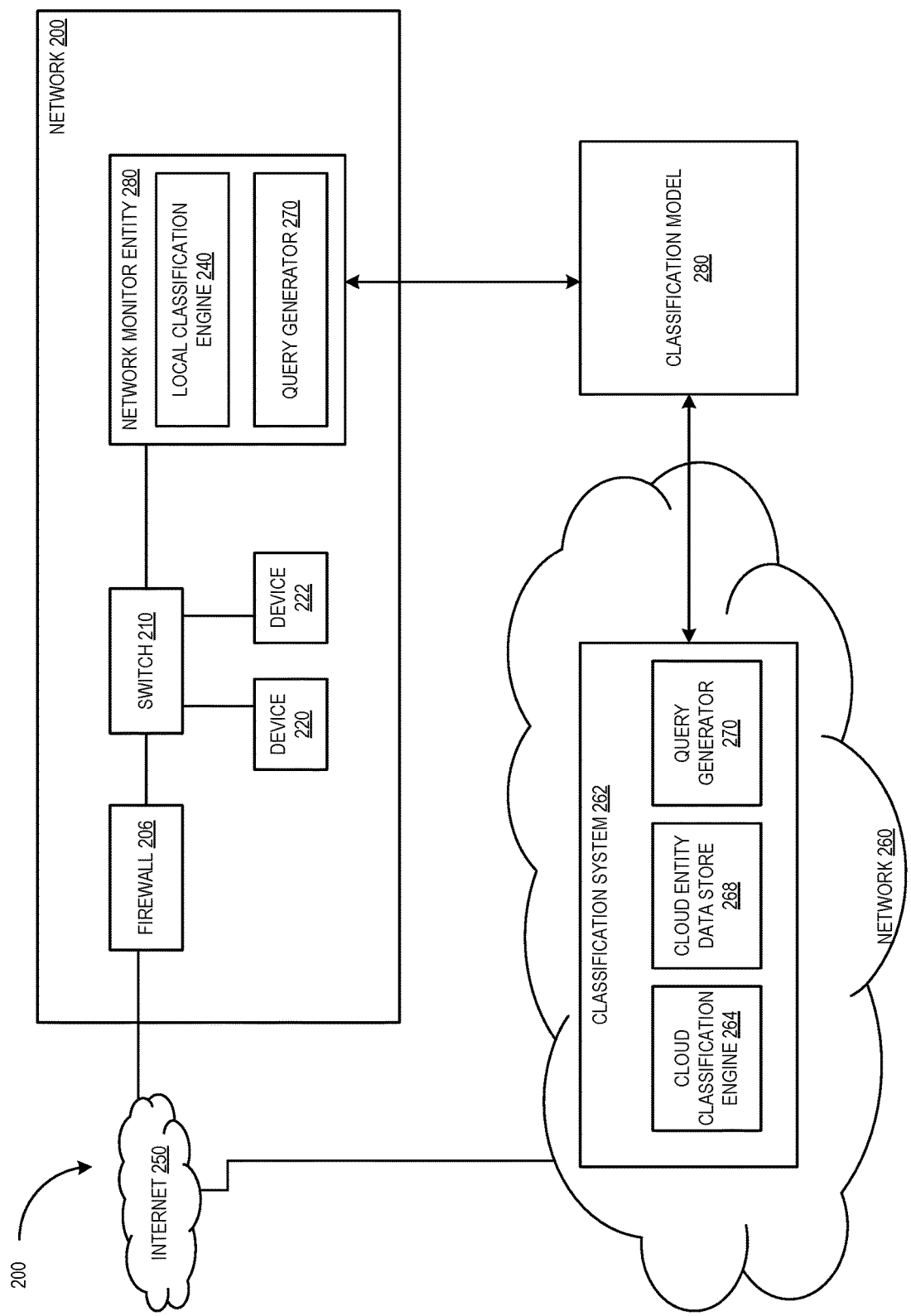
FIG. 2 depicts an illustrative network topology in accordance with one implementation of the present disclosure.

FIG. 2 depicts an example network 200 with multiple enforcement points (e.g., firewall 206 and switch 210) and a network monitor entity 280 (e.g., network monitor entity 102) which can perform entity classification using iterative queries to a classification model 280 within the context of a defined taxonomy framework, as described herein.

FIG. 2 further shows example devices 220-222 (e.g., devices 106, 122A-B, 120, and 130, other physical or virtual devices, other entities, etc.) and it is appreciated that more or fewer network entities or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based entity or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various entities of network 200 including firewall 206, network monitor entity 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of an entity of network 200 by sending one or more requests to the entity of network 200. The information from passive and active scans of entities of network 200 can be used to determine information, such as one or more features, properties, attributes, etc. associated with the entities of network 200.

Network monitor entity 280 includes local classification engine 240 and query generator 270. Local classification engine 240 may perform classification of the entities of network 200 including firewall 206, switch 210, and devices 220-222. Local classification engine 240 may classify (e.g., assign a taxonomy) one or more entities of network 200 based on the information collected about, or otherwise associated with the entities. For example, local classification engine 240 may use the query generator 270 to iteratively prompt a classification model 280 to classify entities coupled to the network 200 within a defined taxonomy framework. In some embodiments, local classification engine 240 can also send data (e.g., attribute or property values) about entities of network 200, as determined by local classification engine 240, to classification system 262 of network 260, described in more detail below. Network 260 may be a cloud-based network (e.g., private or public cloud) of interconnected computing devices for providing computing services. Local classification engine 240 may encode and encrypt the data prior to sending the data to classification system 262. Local classification engine 240 may receive a classification (e.g., an assigned taxonomy) from classification system 262 which network monitor entity 280 can use to perform various security related measures, as describe above with respect to FIG. 1. In some embodiments, classification of an entity may be performed in part by local network monitor entity 280 (e.g., local classification engine 240) and in part by classification system 262 (e.g., cloud classification engine 264).

Classification system 262 may be a cloud classification system operable to perform entity classification using query generator 270 to iteratively generate prompts to classification model 280 within a taxonomy framework, as described herein. In some embodiments, classification system 262 may be part of a larger system operable to perform a variety of functions, e.g., part of a cloud-based network monitor entity, security device, etc. For example, classification system 262 can collect information associated with entities of network 200 and store the information at cloud entity data store 268 to be used for classifying of the entities of the network 200. In some examples, cloud classification engine 264 may perform classification of devices of the network 200 (e.g., devices 220-222) by generating prompts (e.g., via query generator 270) to a classification model 280, such as a large language model. For example, cloud classification engine 264 may instruct query generator 270 to iteratively generate prompts to the classification model 280 to classify a device at various levels of a taxonomy framework using information associated with the device, such as device profiles (e.g., device properties, features, attributes, characteristics, etc., collected by network monitor entity 280) stored at cloud entity data store 268.

Figure 3:
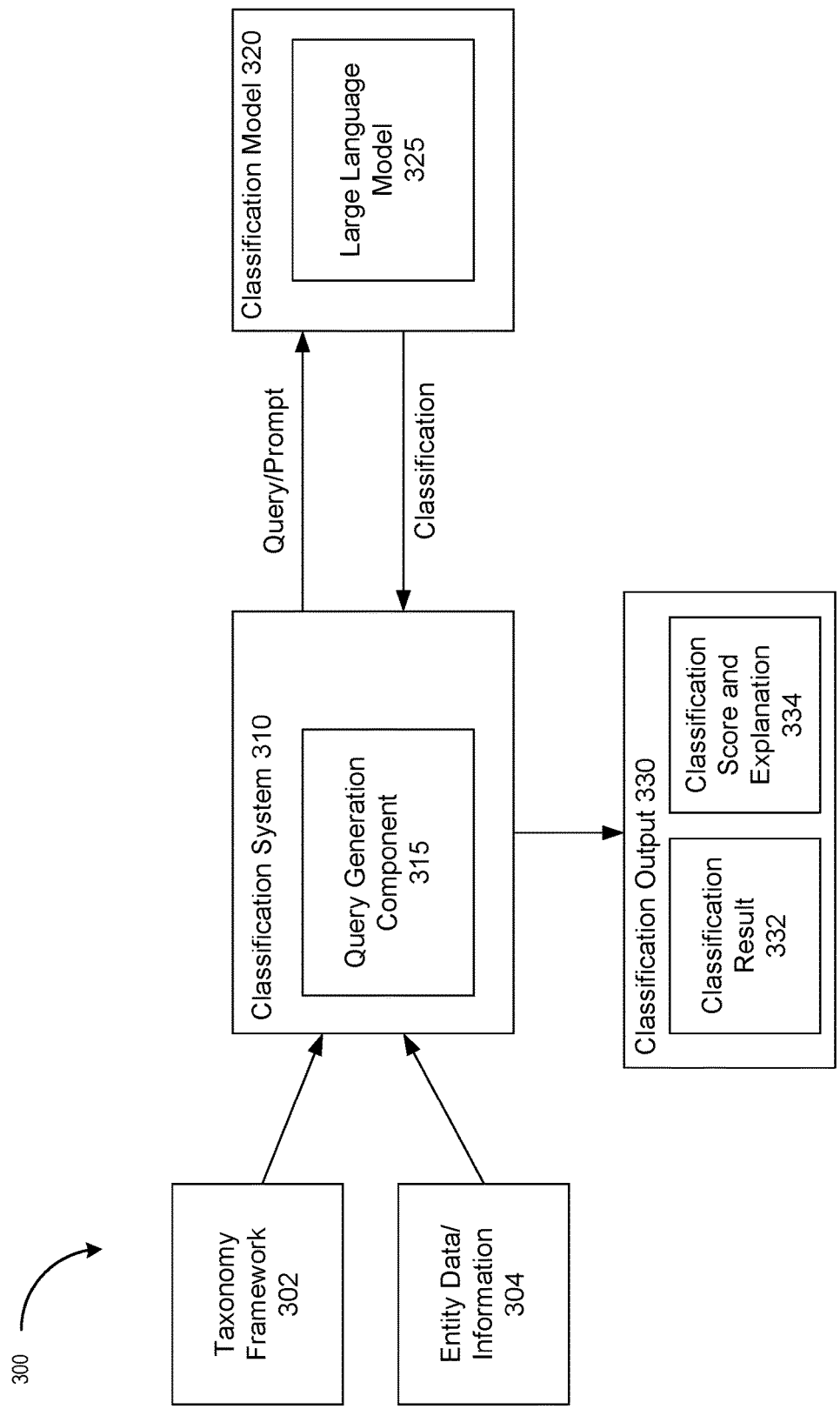
FIG. 3 depicts an example of a system for entity classification via an artificial intelligence model using a defined taxonomy framework, according to some embodiments of the present disclosure.
Figure 4:
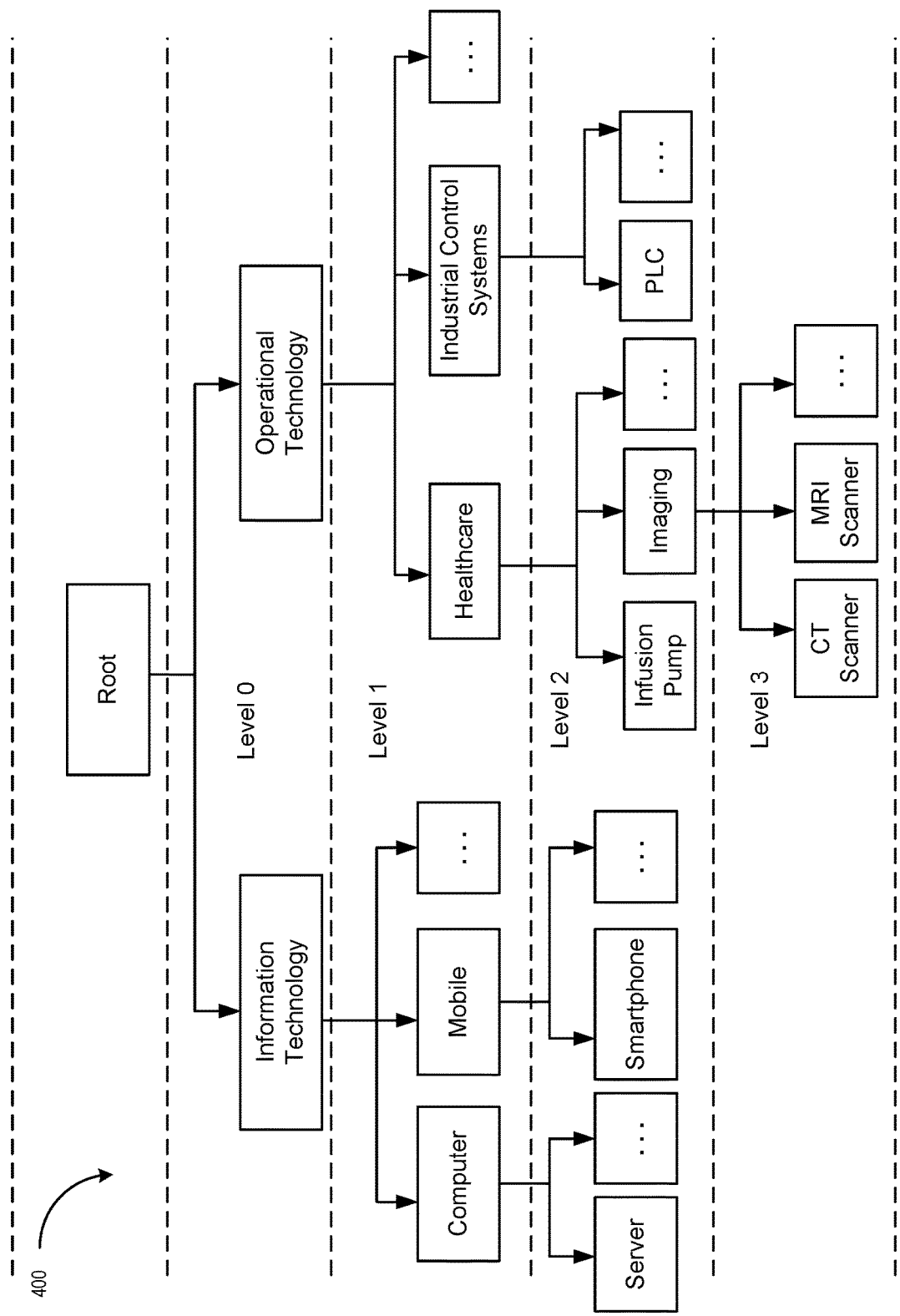
FIG. 4 depicts an example taxonomy framework represented by a taxonomy tree, according to some embodiment of the present disclosure.

FIG. 3 depicts an example of a system 300 for performing entity classification via an AI classification model using a defined taxonomy framework, according to some embodiments of the present disclosure. System 300 includes a classification system 310 for managing entity classification and management of a taxonomy framework (e.g., taxonomy framework 302). Classification system 310 may be the same or similar to classification system 262 or network monitor entity 280 of FIG. 2. Classification system 310 may receive, access, or otherwise obtain a taxonomy framework 302 and entity data 304. In some embodiments, the taxonomy framework 302 may be a defined classification tree which can be used to apply a taxonomy path to an entity for classification. For example, the classification tree may begin at a root node and include several levels of granularity of classification, wherein the classifications at each granularity level depend from (e.g., as child nodes) a classification or node of a previous level, as depicted in FIG. 4. The entity data 304 may include data collected for an entity coupled to a network, entity data from a database of entities, a name or description of an entity, or any other identifying information associated with an entity that may be used to determine a classification of the entity.

In some embodiments, the classification system 310 may include a query generation component 315. The query generation component 315 may generate a query, or prompt, for classification model 320 using the taxonomy framework 302 and the entity data 304. For example, the query generation component 315 may iteratively generate prompts for each level of the taxonomy framework 302 with the entity data 304. The query generation component 315 may generate a prompt for a first classification level of the taxonomy framework 302 by including the options for classification from the first classification level in the prompt along with the entity data 304. The classification system 310 may provide the prompt to the classification model 320. The classification model 320 may then select from the options for classification at the first classification granularity level 320 based on the entity data 304 and return the selection to the classification system 310. Upon receiving the classification selection for the first classification granularity level 320, the classification system 310 may instruct the query generation component 315 to generate a second prompt for the next level of the taxonomy framework. More specifically, the query may include the child nodes of the selected classification from the first level as the options for classification. Similarly, the classification system 310 may provide the second prompt to the classification model 320 which may then select from the provided options of the second level of the taxonomy framework 302 based on the entity data 304 and provide the selection back to the classification system 310. The classification system 310 may continue the above prompt generation process for each level of the taxonomy framework 302 until a leaf node is reached, indicating the final complete classification of the entity, or until the classification model 320 determines that the entity cannot be classified within the set of provided classification options from taxonomy framework 302. In some embodiments, if the classification model 320 is unable to classify the entity within a level of the taxonomy framework 302 (e.g., if the entity data 304 is insufficient or lacks sufficient detail to classify the entity at an additional, more specific level of granularity) then the classification system 310 may determine that a most granular classification has been reached and use the last successful level of classification as the final classification of the entity. In some embodiments, the classification model 320 may provide a confidence score with a classification selection at each level of the taxonomy framework. Accordingly, the classification system 310 may determine whether a classification is sufficient by comparing the confidence score to a minimum threshold confidence score. For example, if the confidence score of a classification at any granularity level is below the threshold confidence score, then the classification system 310 may determine that the classification or the information available to perform the classification is insufficient.

In some embodiments, once the leaf node of the taxonomy framework 302 is reached or the classification system 310 determines a classification cannot be made at any level of the taxonomy framework 302, a final taxonomy pathway can be determined from each of the classification selections at each level of the taxonomy framework 302. The classification system 310 may output the taxonomy pathway as a classification output 330 including the classification result 332 (e.g., the taxonomy pathway). Additionally, the classification output 330 may include a classification score and explanation 334 of the classification result 332. For example, the classification model 320 may include a large language model 325 which may provide a text reasoning for the classification selection at each level of the taxonomy framework 302. Additionally, the prompts to the classification model 320 may include natural language prompts such as a request to select a classification of an entity from a set of denoted options from the taxonomy framework 302 based on the entity data 304.

FIG. 4 illustrates an example device classification taxonomy framework depicted as a directed classification tree. A device classification taxonomy may be represented by a sequence of string labels from the root to the highest-level classification. The level of a node corresponds to the depth of the node in the tree (i.e., the length of the path to the root). In some examples, a specific node of the framework may be denoted by the sequence of labels from the root to the node, e.g., "/IT/Networking/Router" denotes a router.

Figure 5:
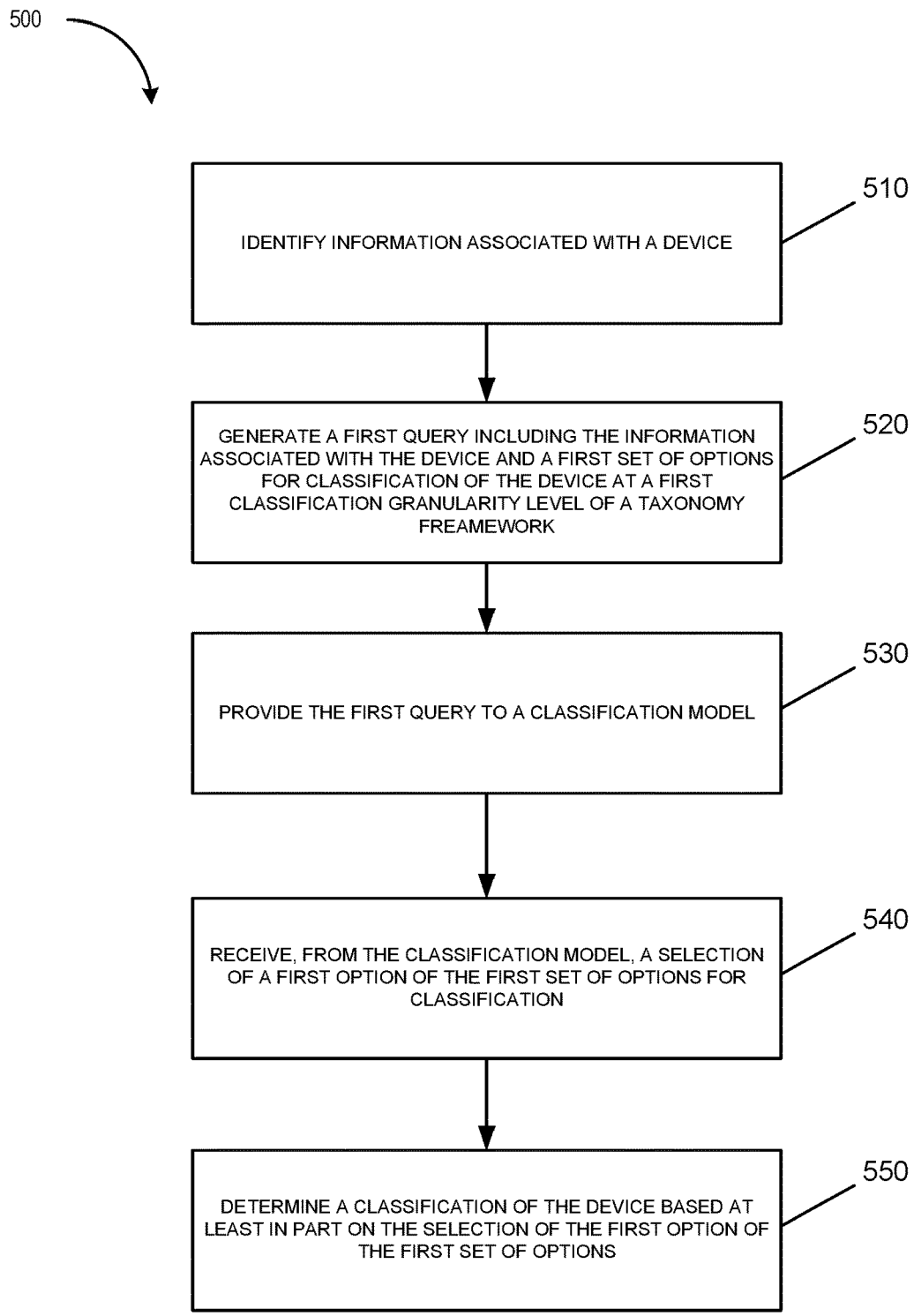
FIG. 5 depicts a flow diagram of an example method of entity classification via an artificial intelligence model using a defined taxonomy framework, according to some embodiments of the present disclosure.

FIG. 5 depicts a flow diagram of aspects of process 500 of entity classification via an AI model using a defined taxonomy framework in accordance with one implementation of the present disclosure. Various portions of process 500 may be performed by different components (e.g., local classification engine 240, cloud classification engine 264, query generator 270, or components of system 800) of an entity or device (e.g., network monitor entity 102, network monitor entity 280, classification system 262, or classification system 310).

Process 500 begins at block 510, where processing logic identifies information associated with an entity. The information may be identifying information associated with the entity, such as properties of the entity, a name or identifier of the entity, or any other information collected about the entity. The entity may be a hardware device, a virtual device (e.g., a container or virtual machine), an account, a user, or any other identifiable entity that may coupled to, or which may communicate with, a network.

At block 520, processing logic generates a first query including the information associated with the entity and a first set of options for classification of the entity at a first classification granularity level of a taxonomy framework. The taxonomy framework may be a defined classification framework, such as a classification tree, in which various levels of classification can be performed for a device. For example, the taxonomy framework may include various levels of classification (e.g., various granularity levels), each of which may depend from a classification of a lower level. For example, as depicted in FIG. 4, the taxonomy framework may be a classification tree beginning at a root node and branching out to more and more specific and narrow classifications. The query may include a question or prompt in a natural language directed to an AI classification model, such as a large language model. The prompt may include a request to classify the entity into one of the potential classifications at a first level of the taxonomy framework. For example, the first set of options may include each potential classification (e.g., IT or OT at level 0 of FIG. 4) at a particular level of the taxonomy framework extending from the prior classification (e.g., each of the child nodes of the prior classification). For example, with respect to FIG. 4, if the previous classification received from the classification model was IT at level 0, then the options provided with the current prompt may include the child nodes of IT including at least "computer", "mobile", etc. branching from the IT node of the taxonomy framework. At block 530, processing logic provides the first query to a classification model. In some examples, the processing logic may interact with an application programming interface of the classification model to provide the prompt. In another example, the processing logic may provide the query to the classification model by inserting the query at a user interface or other input field of the classification model.

At block 540, processing logic receives, from the classification model, a selection of a first option of the first set of options for classification. The classification model may determine, from the entity information provided via the first query, in which of the first set of options for classification the entity most likely belongs. In some embodiments, the classification model may be a large language model. In some examples, the classification model may determined that the entity cannot be classified within one of the provided options. In some examples, the classification model determines the classification from publicly available information. In some examples, the classification model may determine the classification from proprietary information or a combination of publicly available information and proprietary information. In some embodiments, the processing logic iteratively generates additional queries to the classification model comprising the information associated with the entity and additional levels of classification granularity levels of the taxonomy framework until a leaf node of the taxonomy framework is reached or the information associated with the entity is insufficient for the classification model to select a classification option at a corresponding level of granularity. At block 550, processing logic determines a classification of the entity based at least in part on the selection of the first option of the first set of options. After receiving the selection of the first option from the first set of options for classification, the processing logic may generate a taxonomy pathway for the entity based on the selection of the first option. In some embodiments, the processing logic may determine the classification based on the classification granularity levels successfully determined by the classification model. For example, the taxonomy pathway may include the classification indicated by the first option and each additional successful classification in a chain of classifications at each level of the taxonomy framework (e.g., IT/computer/server/ . . . ).

Figure 6:
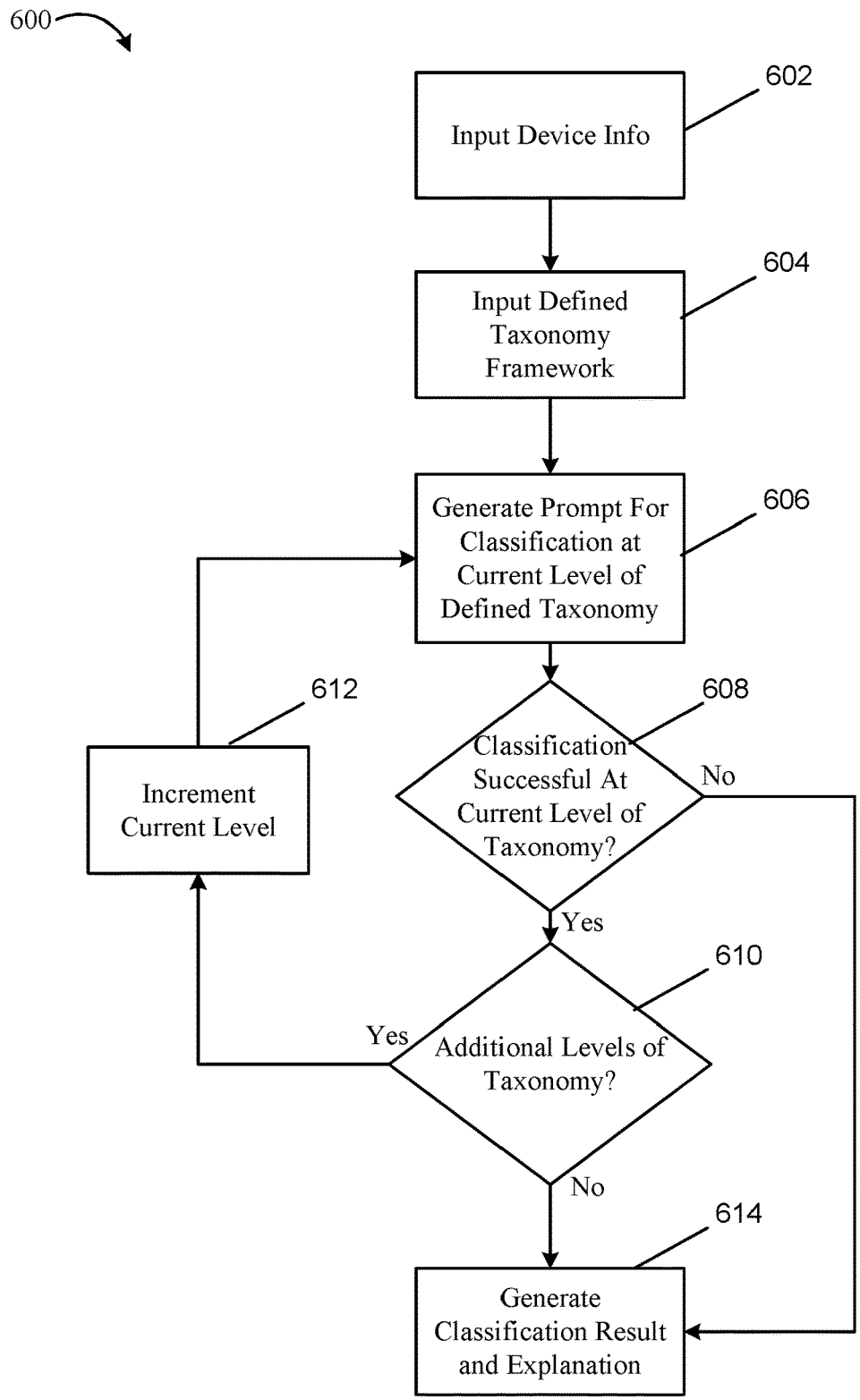
FIG. 6 depicts a flow diagram illustrating another example method of entity classification via an artificial intelligence model using a defined taxonomy framework, according to some embodiments of the present disclosure.

FIG. 6 depicts a flow diagram of aspects of another example process 600 for device classification within a taxonomy framework and management of the taxonomy framework using an AI model, in accordance with one implementation of the present disclosure. Various portions of process 600 may be performed by different components (e.g., local classification engine 240, cloud classification engine 264, query generator 270, or components of system 800) of an entity or device (e.g., network monitor entity 102, network monitor entity 280, classification system 262, or classification system 310).

Process 600 begins at block 602, where processing logic inputs device information to a classification system. The information may be identifying information associated with the entity, such as properties of the entity, a name or identifier of the entity, or any other information collected about the entity. For example, as described with respect to FIGS. 1 and 2, the information may be collected from monitoring of network traffic (e.g., entity properties extracted from network traffic), obtained from third-party systems, received from an agent operating on the device, from active querying of the device, or any other source of device information. In some examples, the device information may be a name of the device or other identifier.

At block 604, processing logic inputs a defined taxonomy framework to the classification system. The defined taxonomy framework may be a classification tree, or other data structure, defining potential classification taxonomies for devices or entities of a network. At block 606, processing logic generates a prompt for classification of an entity at a current level of the defined taxonomy framework. The prompt may include the device information and one or more options for classification at the current level of the taxonomy framework. For example, the options for classification may be a set of potential classifications at a particular granularity. In some embodiments, the prompt may further include term definitions and various parameters for providing additional clarity and uniformity of results from the classification model.

At block 608, processing logic determines whether the classification at the current level of the taxonomy framework is successful. For example, the processing logic may determine whether the device can be classified within one of the options provided with the prompt. If successful, the process proceeds to block 610. If unsuccessful, the processing logic proceeds to block 614.

At block 610, processing logic determines whether there are additional levels of the taxonomy framework for classifying the entity. For example, the processing logic may determine if a leaf node of the classification tree has been reached. If there are additional levels, the process proceeds to block 612, wherein processing logic increments the current level of the framework for classification and returns to block 606 for generating a prompt at the new current level of the taxonomy. Accordingly, the processing logic may iteratively prompt the classification model at more granular levels of the defined taxonomy framework until a leaf node is reached, or a classification cannot be made within the taxonomy framework.

At block 614, processing logic generates a classification result and explanation of the classification result. In some embodiments, the classification model may generate a reasoned explanation for each selection for classification at the various levels of the taxonomy framework. Accordingly, the processing logic may provide an explanation of the final classification result of the device (e.g., the final taxonomy string) from the explanations provided by the classification model.

Figure 7:
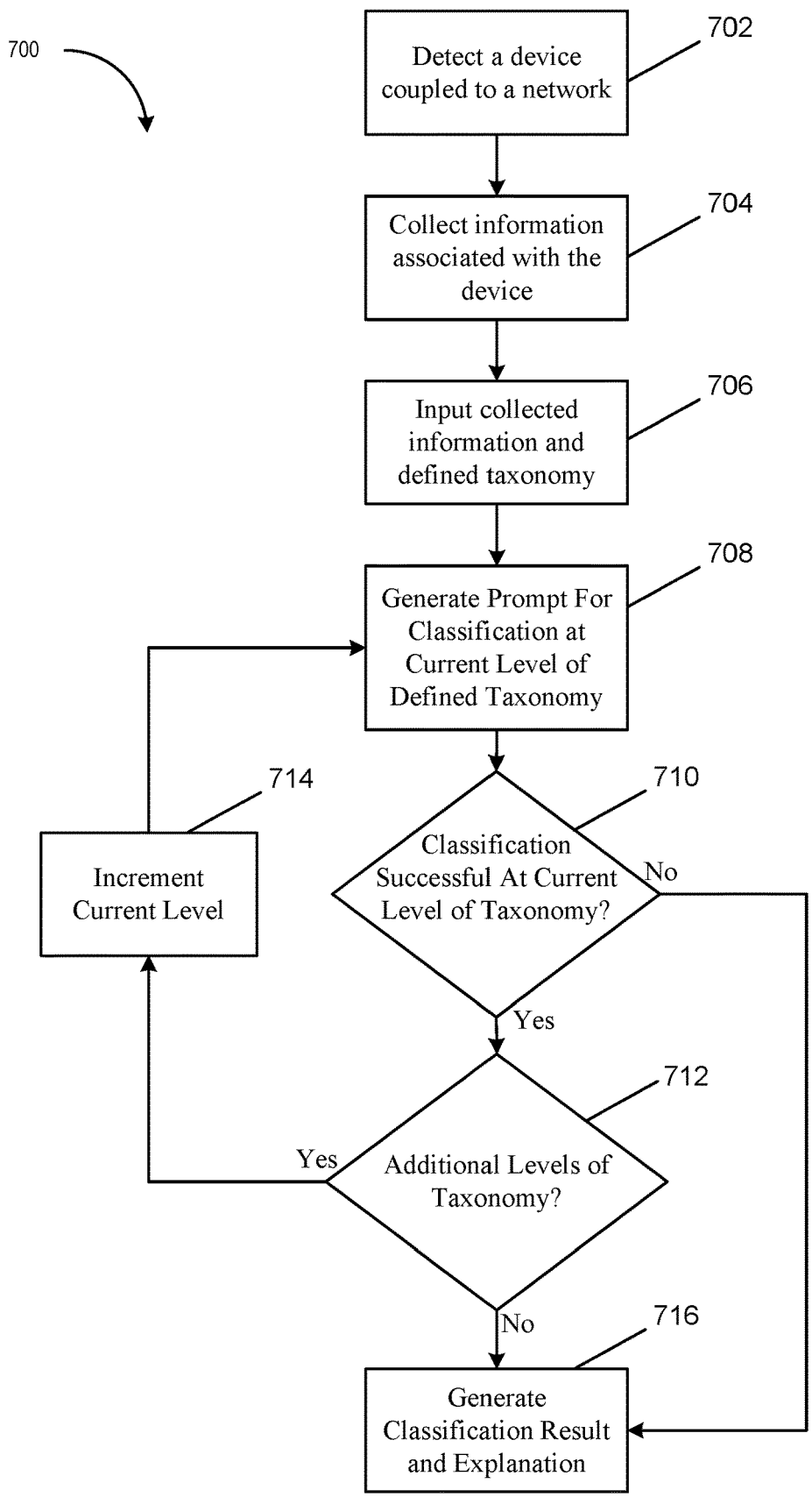
FIG. 7 depicts a flow diagram illustrating an example method of classifying an unknown network entity via an artificial intelligence model using a defined taxonomy framework, according to some embodiments of the present disclosure.

FIG. 7 depicts a flow diagram of aspects of process 700 for classification of a entity coupled to a network via an AI model using a defined taxonomy framework, in accordance with one implementation of the present disclosure. Various portions of process 700 may be performed by different components (e.g., local classification engine 240, cloud classification engine 264, query generator 270, or components of system 800) of an entity or device (e.g., network monitor entity 102, network monitor entity 280, classification system 262, or classification system 310).

Process 700 begins at block 702, where processing logic detects a device coupled to a network. At block 704, processing logic collects information associated with the device, as described above with respect to FIGS. 1 and 2. For example, a network monitor entity may detect the coupled device and monitor network traffic associated with the device. The network monitor entity may extract properties or information associated with the device from the network traffic of the device.

At block 706, processing logic inputs the collected information and a defined taxonomy framework into a classification system. The defined taxonomy framework may be a classification tree, or other data structure, defining potential classification taxonomies for devices or entities of a network.

At block 708, processing logic generates a prompt for classification of an entity at a current level of the defined taxonomy framework. The prompt may include the collected device information and one or more options for classification at the current level of the taxonomy framework. For example, the options for classification may be a set of potential classifications at a particular granularity.

At block 710, processing logic determines whether the classification at the current level of the taxonomy framework is successful. For example, the processing logic may determine whether the device can be classified within one of the options provided with the prompt. If successful, the process proceeds to block 712. If unsuccessful, the processing logic proceeds to block 716.

At block 712, processing logic determines whether there are additional levels of the taxonomy framework for classifying the entity. For example, the processing logic may determine if a leaf node of the classification tree has been reached. If there are additional levels, the process proceeds to block 714, wherein processing logic increments the current level of the framework for classification and returns to block 708 for generating a prompt at the new current level of the taxonomy. Accordingly, the processing logic may iteratively prompt the classification model at more granular levels of the defined taxonomy framework until a leaf node is reached, or a classification cannot be made within the taxonomy framework.

At block 716, processing logic generates a classification result and explanation of the classification result. In some embodiments, the classification model may generate a reasoned explanation for each selection for classification at the various levels of the taxonomy framework. Accordingly, the processing logic may provide an explanation of the final classification result of the device (e.g., the final taxonomy string) from the explanations provided by the classification model.

Figure 8:
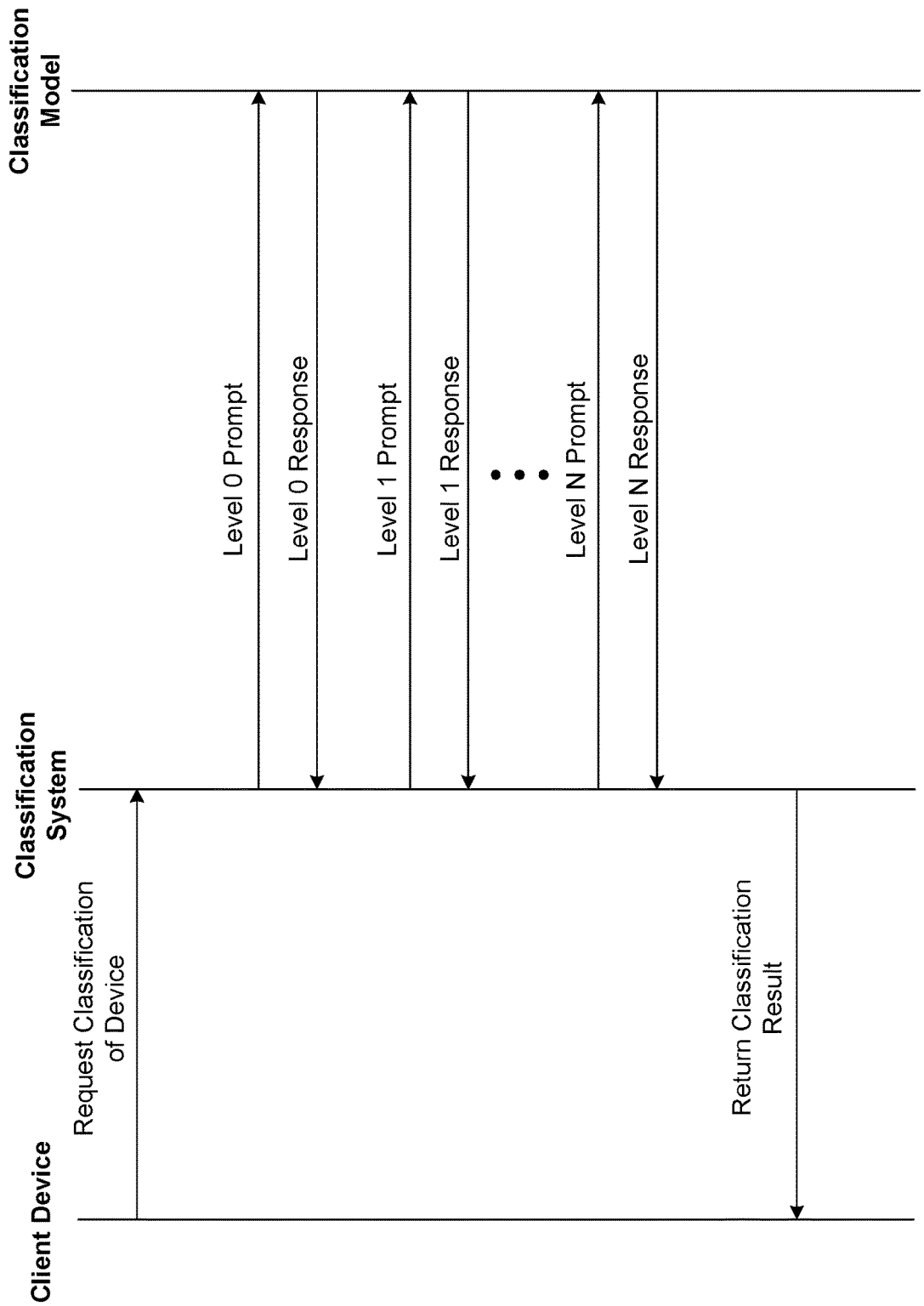
FIG. 8 depicts an example workflow for performing an entity classification by an artificial intelligence model using a defined taxonomy framework, according to some embodiments of the present disclosure.

FIG. 8 depicts example workflow for performing an entity classification by an artificial intelligence model using a defined taxonomy framework, according to some embodiments of the present disclosure. In some embodiments, a client device requests a classification of a device or entity. For example, the client device may be a user device or other interface for requesting a classification. The classification system may receive the request and generate and send one or more prompts to the classification model for classifying the device. For example, as depicts, the classification system may send a prompt including level 0 options for classifying the entity within a taxonomy framework (e.g., level 0 as depicted in FIG. 4). The prompt may include information associated with the entity to be classified, such as properties of the entity, a name of the entity, or any other identifying information. The classification model may determine a classification from the options included in the prompt and generate a response to the level 0 prompt. Once the level 0 response is received, the classification system may generate a follow up response with the next level of options for classification from the taxonomy framework. The classification model may generate a level 1 response including the selected classification from the level 1 prompt. The classification system may interact and prompt the classification model iteratively, as described above, until a leaf node of the taxonomy framework is reached or a classification is unable to be made by the classification model at a level of the taxonomy, at which point the classification model may generate a new classification category for the entity. The classification system may then return the classification result to the client device. The classification result may include a taxonomy pathway for the device including the classification at each level of the taxonomy framework from the root to the leaf node.

Figure 9:
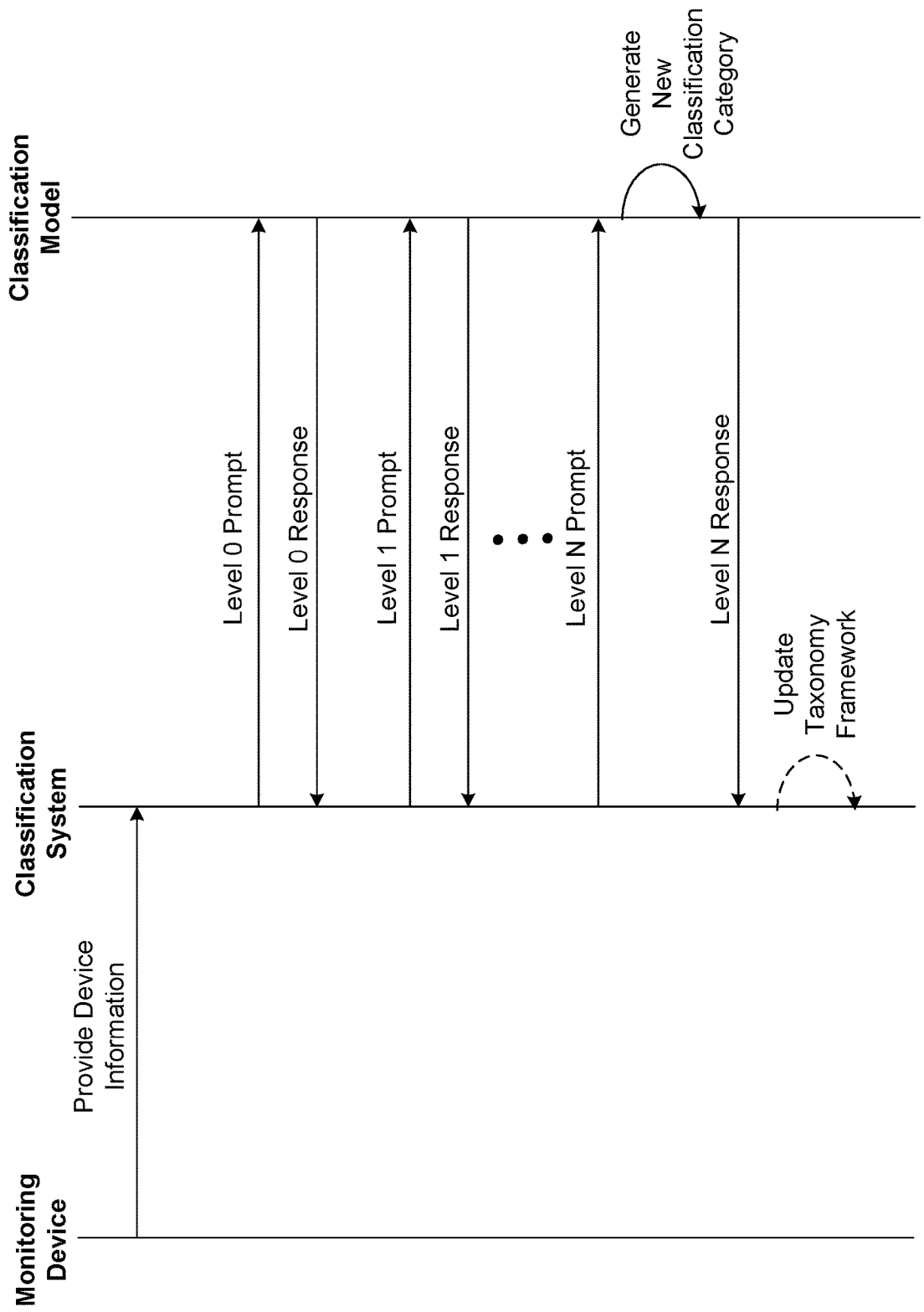
FIG. 9 depicts an example workflow for performing classification of a network monitored entity by an artificial intelligence model using a defined taxonomy framework, according to some embodiments of the present disclosure.

FIG. 9 depicts an example workflow for managing a taxonomy framework for entity classification by an artificial intelligence model, according to some embodiments of the present disclosure. In some embodiments, a monitoring device (e.g., a network monitoring device) collects and provides device information to a classification system. The information may be properties of the device, an identified of the device, or other information associated with the device. The device information may be collected by monitoring network traffic, manual identification of devices on the market, information collected from third party systems, information collected from an agent deployed to a device, etc. The classification system may then generate a prompt (e.g., level 0 prompt) including the device information and the classification options from the first level, level 0, of a taxonomy framework. The classification system may then provide the level 0 prompt to the classification model. The classification model may determine or select a classification from one of the options provided by the level 0 prompt and return the selection to the classification system (e.g., level 0 response). Based on the selected classification from the level 0 response, the classification system may then generate and provide a level 1 prompt including the next set of options at the level 1 of the taxonomy framework. The prompt options may be the child nodes of the previously selected classification. The classification system may continue to prompt the classification model until the classification model determines that the device cannot be classified within one of the options provided by a prompt (e.g., cannot be classified within the current taxonomy framework. The classification model may then generate a new classification category at the current level N of the taxonomy framework and provide the new classification category to the classification system (e.g., in the level N response). The classification system may then update the taxonomy framework to include the new classification category at the corresponding level N of the taxonomy framework (e.g., by adding it as a child node of the last classification selected at the N−1 level of the framework). Accordingly, the classification system may continuously manage and update the taxonomy framework as new devices are deployed to the market and information is collected about new devices.

Figure 10:
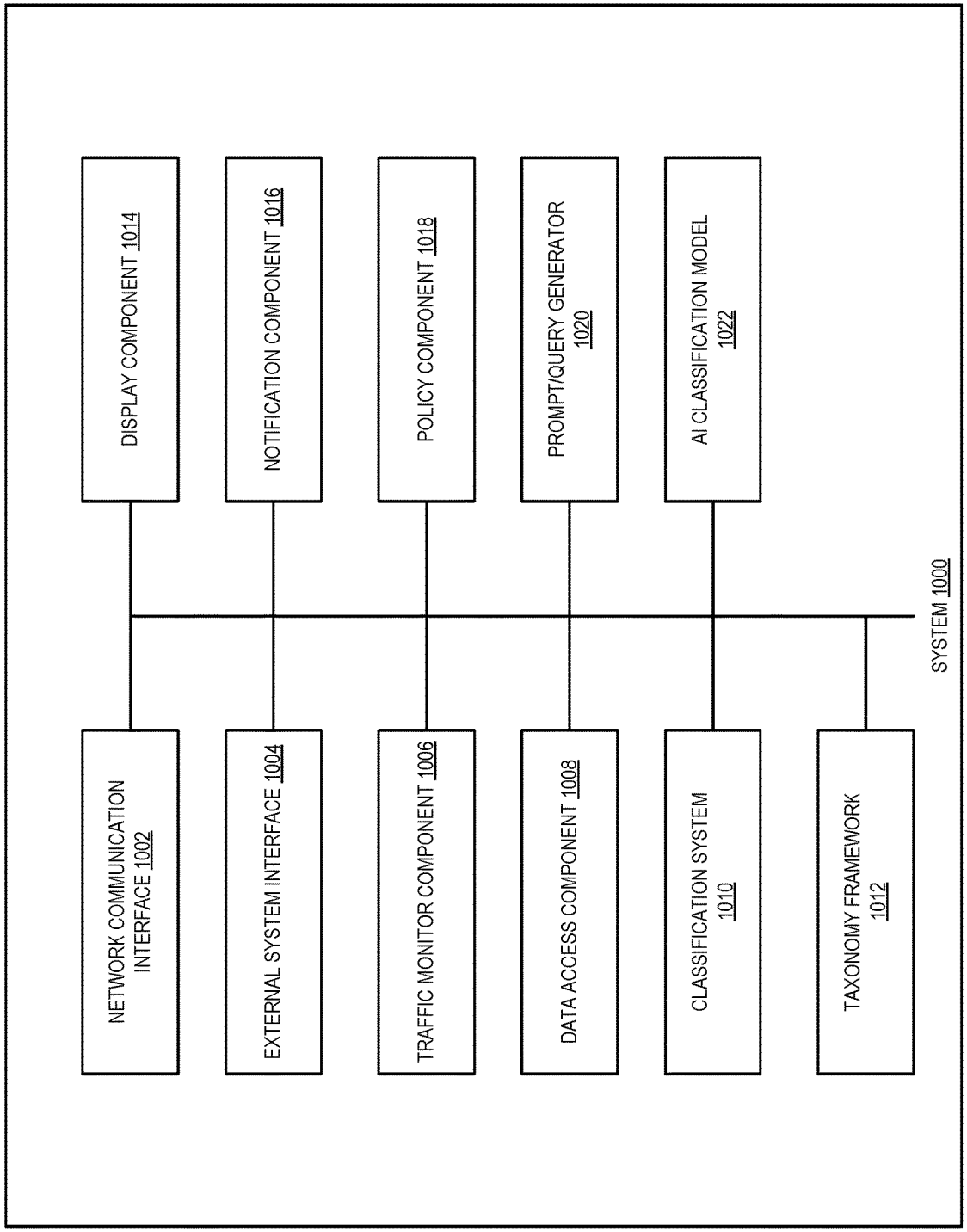
FIG. 10 depicts a component diagram for entity classification via an artificial intelligence model using a defined taxonomy framework, according to embodiments of the present disclosure.

FIG. 10 depicts illustrative components of a system for entity classification via an AI model using a defined taxonomy framework, in accordance with one implementation of the present disclosure. Example system 1000 includes a network communication interface 1002, an external system interface 1004, a traffic monitor component 1006, a data access component 1008, a classification system 1010, a taxonomy framework 1012, a display component 1014, a notification component 1016, a policy component 1018, prompt/query generator 1020, and an AI classification model 1022. The components of system 1000 may be part of a computing system or other electronic device (e.g., network monitor entity 102) or a virtual machine or device and be operable to monitor one or more entities communicatively coupled to a network, monitor network traffic, perform entity classification via an AI model using a defined taxonomy framework, manage the taxonomy framework using the AI model, or perform one or more actions (e.g., security action, remediation action, etc.), as described herein. For example, the system 1000 may further include a memory and a processing device, operatively coupled to the memory, which may perform the operations of or execute the components of system 1000. The components of system 1000 may access various data and characteristics or features associated with an entity (e.g., network communication information) and data associated with one or more entities. It is appreciated that the modular nature of system 1000 may allow the components to be independent and allow flexibility to enable or disable individual components or to extend, upgrade, or combination thereof components without affecting other components thereby providing scalability and extensibility. System 1000 may perform one or more blocks of flow diagrams 500-800. In some embodiments, the components of 1000 may be part of network monitor device (e.g., network monitor entity 102), in the cloud, or the various components may be distributed between local and cloud resources.

Communication interface 1002 is operable to communicate with one or more entities (e.g., network device 104) coupled to a network that are coupled to system 1000 and receive or access information about entities (e.g., device information, device communications, device characteristics, features, etc.), access information as part of a passive scan, send one or more requests as part of an active scan, receive active scan results or responses (e.g., responses to requests), as described herein. The communication interface 1002 may be operable to work with one or more components to initiate access to sources of device characteristics for determination of characteristics of an entity to allow determination of one or more features which may then be used for device compliance, asset management, standards compliance, classification, identification, risk assessment or analysis, vulnerability assessment or analysis, etc., as described herein. Communication interface 802 may be used to receive and store network traffic for entity classification via an AI model using a defined taxonomy framework, as described herein.

External system interface 1004 is operable to communicate with one or more third party, remote, or external systems to access information including characteristics or features of an entity (e.g., to be used to determine a security aspects) or cyber threat intelligence. External system interface 1004 may further store the accessed information in a data store. For example, external system interface 1004 may access information from a vulnerability assessment (VA) system to enable determination of one or more compliance or risk characteristics associated with an entity. External system interface 1004 may be operable to communicate with a vulnerability assessment (VA) system, an advanced threat detection (ATD) system, a mobile device management (MDM) system, a firewall (FW) system, a switch system, an access point (AP) system, etc. External system interface 1004 may query a third-party system using an API or CLI. For example, external system interface 1004 may query a firewall or a switch for information (e.g., network session information) about an entity or for a list of entities that are communicatively coupled to the firewall or switch and communications associated therewith. In some embodiments, external system interface 1004 may query a switch, a firewall, or other system for information of communications associated with an entity.

Traffic monitor component 806 is operable to monitor network traffic to monitor network traffic associated with entities coupled to a network. Traffic monitor component 1006 may have a packet engine operable to access packets of network traffic (e.g., passively) and analyze the network traffic. The traffic monitor component 1006 may further be able to access and analyze traffic logs from one or more entities (e.g., network device 104, system 150, or aggregation device 106) or from an entity being monitored. The traffic monitor component 1006 may further be able to access traffic analysis data associated with an entity being monitored, e.g., where the traffic analysis is performed by a third-party system.

Data access component 1008 may be operable for accessing data including metadata associated with one or more network monitoring entities (e.g., network monitor entities 102), including features that the network monitoring entity is monitoring or collecting, software versions (e.g., of a profile library of the network monitoring entity), and the internal configuration of the network monitoring entity. The data accessed by data access component 1008 may be used by embodiments for entity classification via an AI model using a defined taxonomy framework. Data access component 808 may further access vertical or environment data and other user associated data, including vertical, environment, common type of entities for the network or network portions, segments, areas with classification issues, etc., which may be used for classification.

Data access component 1008 may access data associated with active or passive traffic analysis or scans or a combination thereof. Information accessed by data access component 1008 may be stored, displayed, and used as a basis for entity classification via an AI model using a defined taxonomy framework, as described herein.

Classification system 1010 may identify, retrieve, receive, or otherwise obtain information associated with a device or entity to be classified (e.g., via data access component 1008, traffic monitor component 1006, etc.). The classification system 1010 may utilize prompt generator to iteratively chain prompts to AI classification model 1022 for the device or entity to be classified within taxonomy framework 1012. For example, the classification system 1010 may cause prompt generator 1020 to generate a first prompt to the AI classification model 1022 including the information associated with the device and options for classification of the device within a first level of the taxonomy framework. The prompt may request the AI classification model 1022 to select from one of the options for classification of the device based on the information associated with the device. The information may include device properties, characteristics, etc. or may include a name or identifier of the device. Upon receiving a response to the query from the AI classification model 1022, the classification system 1010 may instruct the prompt generator to generate another query to select from a set of options for classification at a second more granular and specific level of the taxonomy framework. For example, the second set of options of the second query may include a subclassification under the umbrella of the first selected classification. Accordingly, the classification system 1010 may continue to generate prompts via the prompt generator 1020 until a leaf node of the taxonomy framework is reached or until the AI classification model 1022 is unable to select from one of the options. For example, if the device cannot be classified into one of the options provided by a prompt, the AI classification model 1022 may determine a new classification of the device. The classification system 1010 may then update the taxonomy framework 1012 to include the new classification the device. Therefore, the classification system 1010 may classify devices and dynamically update the taxonomy framework as unknown or new devices are identified.

Figure 11:
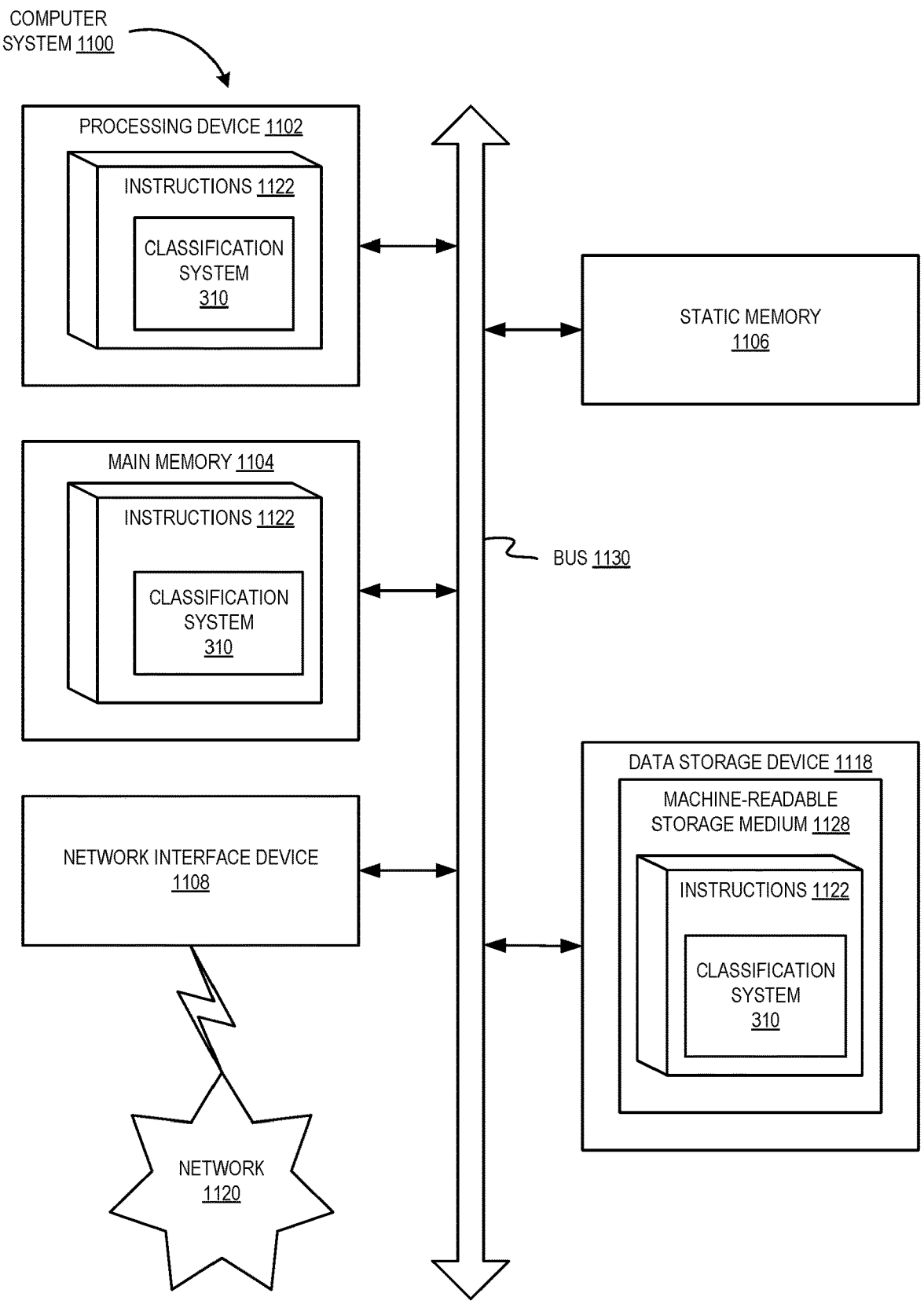
FIG. 11 is a block diagram illustrating an example computer system, in accordance with one implementation of the present disclosure.

FIG. 11 illustrates a diagrammatic representation of a machine in the example form of a computer system 1100 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1100 may be representative of a server, such as network monitor entity 102 running system 1000 to perform entity classification via an AI model using a defined taxonomy framework and managing the taxonomy framework using the AI model.

The exemplary computer system 1100 includes a processing device 1102, a main memory 1104 (e.g., read-only memory (ROM), flash memory, dynamic random access memory (DRAM), a static memory 1106 (e.g., flash memory, static random access memory (SRAM), etc.), and a data storage device 1118, which communicate with each other via a bus 1130. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1122, which may be one example of process 500, 600, 700, or 800 of FIGS. 5-8 or system 1000 shown in FIG. 10, for performing the operations and steps discussed herein.

The data storage device 1118 may include a machine-readable storage medium 1128, on which is stored one or more set of instructions 1122 (e.g., software) embodying any one or more of the methodologies of operations described herein, including instructions 1122 to cause the processing device 1102 to perform entity classification via an AI model using a defined taxonomy framework, management of the taxonomy framework using the AI model, or a combination thereof. The instructions 1122 may also reside, completely or at least partially, within the main memory 1104 or within the processing device 1102 during execution thereof by the computer system 1100; the main memory 1104 and the processing device 1102 also constituting machine-readable storage media. The instructions 1122 may further be transmitted or received over a network 1120 via the network interface device 1108.

The machine-readable storage medium 1128 may also be used to store instructions to perform entity classification via an AI model using a defined taxonomy framework, as described herein. While the machine-readable storage medium 1128 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   identifying information associated with an entity;
   generating, by a processing device, a first query comprising the information associated with the entity and a first set of options for classification of the entity at a first classification granularity level of a taxonomy framework, wherein the taxonomy framework comprises a plurality of classification granularity levels, each granularity level comprising a set of options for classification at the corresponding granularity level;
   providing the first query comprising the information associated with the entity and the first set of options for classification to a classification model;
   receiving, from the classification model, a selection of a first option of the first set of options for classification; and
   determining a classification of the entity based at least in part on the selection of the first option of the first set of options.

2. The method of claim 1, further comprising:
iteratively generating additional queries to the classification model comprising the information associated with the entity and additional levels of classification granularity levels of the taxonomy framework until a leaf node of the taxonomy framework is reached or the information associated with the entity is insufficient for the classification model to select a classification option at a corresponding level of granularity; and
determining the classification of the entity based on the classification granularity levels successfully determined by the classification model.

3. The method of claim 1, further comprising:
generating a second query comprising the information and a second set of options for a second level of classification granularity of the taxonomy framework;
receiving, from the classification model, a selection of a second option of the second set of options for classification; and
determining a classification of the entity based at least in part on the selection of the first option of the first set of options and the second option of the second set of options.

4. The method of claim 3, wherein the taxonomy framework comprises a classification tree in which each level of the classification tree comprises a different granularity of classification, and wherein the first level of classification granularity of the taxonomy framework is broader than the second level of classification granularity of the taxonomy framework.

5. The method of claim 4, wherein the classification model comprises a large language model.

6. The method of claim 5, wherein the second query is performed in response to receiving the selection of the first option from the first level of the taxonomy framework.

7. The method of claim 6, wherein the second set of options comprises a set of child nodes of the first option from the first level of the taxonomy framework.

8. A system comprising:
a memory; and
a processing device, operatively coupled to the memory, to:
identify information associated with an entity;
generate a first query comprising the information associated with the entity and a first set of options for classification of the entity at a first level of classification granularity of a taxonomy framework, wherein the taxonomy framework comprises a plurality of classification granularity levels, each granularity level comprising a set of options for classification at the corresponding granularity level;
provide the first query comprising the information associated with the entity and the first set of options for classification to a classification model;
receive, from the classification model, a selection of a first option of the first set of options for classification; and
determine a classification of the entity based at least in part on the selection of the first option of the first set of options.

9. The system of claim 8, wherein the processing device is further to:
iteratively generate additional queries to the classification model comprising the information associated with the entity and additional levels of classification granularity levels of the taxonomy framework until a leaf node of the taxonomy framework is reached or the information associated with the entity is insufficient for the classification model to select a classification option at a corresponding level of granularity; and
determine the classification of the entity based on the classification granularity levels successfully determined by the classification model.

10. The system of claim 9, wherein the processing device is further to:
generate a second query comprising the information and a second set of options for a second level of classification granularity of the taxonomy framework;
receive, from the classification model, a selection of a second option of the second set of options for classification; and
determine a classification of the entity based at least in part on the selection of the first option of the first set of options and the second option of the second set of options.

11. The system of claim 10, wherein the taxonomy framework comprises a classification tree in which each level of the classification tree comprises a different granularity of classification, and wherein the first level of classification granularity of the taxonomy framework is broader than the second level of classification granularity of the taxonomy framework.

12. The system of claim 11, wherein the classification model comprises a large language model.

13. The system of claim 12, wherein the processing device performs the second query in response to receiving the selection of the first option from the first level of the taxonomy framework.

14. The system of claim 13, wherein the second set of options comprises a set of child nodes of the first option from the first level of the taxonomy framework.

15. A non-transitory computer readable storage medium including instructions that, when executed by a processing device, cause the processing device to:
identify information associated with an entity;
generate, by the processing device, a first query comprising the information associated with the entity and a first set of options for classification of the entity at a first level of classification granularity of a taxonomy framework, wherein the taxonomy framework comprises a plurality of classification granularity levels, each granularity level comprising a set of options for classification at the corresponding granularity level;
provide the first query comprising the information associated with the entity and the first set of options for classification to a classification model;
receive, from the classification model, a selection of a first option of the first set of options for classification; and
determine a classification of the entity based at least in part on the selection of the first option of the first set of options.

16. The non-transitory computer readable storage medium of claim 15, wherein the processing device is further to:
iteratively generate additional queries to the classification model comprising the information associated with the entity and additional levels of classification granularity levels of the taxonomy framework until a leaf node of the taxonomy framework is reached or the information associated with the entity is insufficient for the classification model to select a classification option at a corresponding level of granularity; and
determine the classification of the entity based on the classification granularity levels successfully determined by the classification model.

17. The non-transitory computer readable storage medium of claim 16, wherein the processing device is further to:
  generate a second query comprising the information and a second set of options for a second level of classification granularity of the taxonomy framework;
  receive, from the classification model, a selection of a second option of the second set of options for classification; and
  determine a classification of the entity based at least in part on the selection of the first option of the first set of options and the second option of the second set of options.

18. The non-transitory computer readable storage medium of claim 17, wherein the taxonomy framework comprises a classification tree in which each level of the classification tree comprises a different granularity of classification, and wherein the first level of classification granularity of the taxonomy framework is broader than the second level of classification granularity of the taxonomy framework.

19. The non-transitory computer readable storage medium of claim 18, wherein the classification model comprises a large language model.

20. The non-transitory computer readable storage medium of claim 19, wherein the processing device performs the second query in response to receiving the selection of the first option from the first level of the taxonomy framework.

* * * * *